US012424184B2

(12) United States Patent
Du et al.

(10) Patent No.: US 12,424,184 B2
(45) Date of Patent: Sep. 23, 2025

(54) DISPLAY BASEPLATE, DISPLAY PANEL, AND DISPLAY APPARATUS

(71) Applicants: Hefei Xinsheng Optoelectronics Technology Co., Ltd., Anhui (CN); BOE Technology Group Co., Ltd., Beijing (CN)

(72) Inventors: Ruifang Du, Beijing (CN); Ya Yu, Beijing (CN); Haijiao Qian, Beijing (CN); Xiaoye Ma, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/695,988

(22) PCT Filed: Jul. 31, 2023

(86) PCT No.: PCT/CN2023/110368
§ 371 (c)(1),
(2) Date: Mar. 27, 2024

(87) PCT Pub. No.: WO2024/045988
PCT Pub. Date: Mar. 7, 2024

(65) Prior Publication Data

US 2024/0412707 A1 Dec. 12, 2024

(30) Foreign Application Priority Data

Sep. 1, 2022 (CN) ........................ 202211065795.5

(51) Int. Cl.
*G09G 3/36* (2006.01)

(52) U.S. Cl.
CPC ... *G09G 3/3677* (2013.01); *G09G 2300/0426* (2013.01); *G09G 2310/08* (2013.01); *G09G 2330/021* (2013.01)

(58) Field of Classification Search
CPC ......... G09G 3/3677; G09G 2300/0426; G09G 2310/08; G09G 2330/021
See application file for complete search history.

(56) References Cited

U.S. PATENT DOCUMENTS 7,807,999 B2 * 10/2010 Kim ....................... H10D 86/00 257/E29.151
2004/0201802 A1 * 10/2004 Ha ....................... G02F 1/1368 349/114

(Continued)

FOREIGN PATENT DOCUMENTS

CN 111487825 A 8/2020
CN 113471225 A 10/2021

(Continued)

*Primary Examiner* — Sejoon Ahn
(74) *Attorney, Agent, or Firm* — WHDA, LLP

(57) ABSTRACT

A display baseplate includes a display region and a peripheral region, and the display baseplate includes: a substrate, and a gate line driving circuit, a plurality of signal lines, and a gate line provided on one side of the substrate, the gate line driving circuit and the plurality of signal lines all being located in the peripheral region, and the gate line being located in the display region. The gate line driving circuit is respectively connected to the plurality of signal lines and the gate line, and includes a plurality of stages of driving units that are cascaded to each other, each driving unit includes a first element group, and the first element group includes at least one first electronic element. The plurality of signal lines are arranged in a first direction, the first direction is an extending direction of the gate line.

17 Claims, 8 Drawing Sheets

(56) References Cited

U.S. PATENT DOCUMENTS

| | | | | |
|---|---|---|---|---|
| 2004/0212575 | A1* | 10/2004 | Lin | G09G 3/3688 345/90 |
| 2006/0050208 | A1* | 3/2006 | Enomoto | G02F 1/13624 349/114 |
| 2009/0322649 | A1* | 12/2009 | Hamer | G09G 3/2085 345/1.3 |
| 2011/0122116 | A1* | 5/2011 | Lin | G09G 3/3648 349/38 |
| 2015/0332641 | A1* | 11/2015 | Iwatsu | G02F 1/13306 345/694 |
| 2016/0019856 | A1 | 1/2016 | Tanaka et al. | |
| 2018/0067353 | A1* | 3/2018 | Son | H01L 24/05 |
| 2022/0115482 | A1 | 4/2022 | Yang et al. | |
| 2023/0029861 | A1 | 2/2023 | Zhou et al. | |
| 2023/0030213 | A1 | 2/2023 | Sun et al. | |
| 2023/0186845 | A1* | 6/2023 | Liu | H10K 59/131 345/76 |
| 2024/0169914 | A1* | 5/2024 | Yamazaki | G09G 3/20 |
| 2024/0172508 | A1 | 5/2024 | Xu et al. | |

FOREIGN PATENT DOCUMENTS

| | | | |
|---|---|---|---|
| CN | 113939863 | A | 1/2022 |
| CN | 114429959 | A | 5/2022 |
| CN | 115273726 | A | 11/2022 |
| KR | 20060009749 | A | 2/2006 |
| WO | 2014/142183 | A1 | 9/2014 |

* cited by examiner

DISPLAY BASEPLATE, DISPLAY PANEL, AND DISPLAY APPARATUS

CROSS-REFERENCES TO RELATED APPLICATIONS

The present disclosure claims the priority of the Chinese patent application filed on Sep. 1, 2022 before the CNIPA, China National Intellectual Property Administration with the application number of 202211065795.5 and the title of "DISPLAY BASEPLATE, DISPLAY PANEL AND DISPLAY APPARATUS", which is incorporated herein in its entirety by reference.

TECHNICAL FIELD

The present disclosure relates to the technical field of display, and particularly relates to a display baseplate, a display panel, and a display apparatus.

BACKGROUND

With the development of display technology, people have increasingly higher requirements on display effects and reliability of display products. As a widely used display panel, a liquid crystal display panel occupies an important position in the field of display.

SUMMARY

The present disclosure provides a display baseplate, including a display region and a peripheral region located on at least one side of the display region, wherein the display baseplate includes:

a substrate, and a gate line driving circuit, a plurality of signal lines, and a gate line provided on one side of the substrate, the gate line driving circuit and the plurality of signal lines all being located in the peripheral region, and the gate line being located in the display region:

wherein, the gate line driving circuit is respectively connected to the plurality of signal lines and the gate line, and includes a plurality of stages of driving units that are cascaded to each other, each driving unit includes a first element group, and the first element group includes at least one first electronic element; and the plurality of signal lines are arranged in a first direction, the first direction is an extending direction of the gate line, and at least one among the plurality of signal lines is located on one side of the first element group close to the display region.

In some optional embodiments, at least one among the plurality of signal lines is located on one side of the driving unit close to the display region.

In some optional embodiments, the driving unit further includes:

a second element group located on one side of the first element group close to the display region and including at least one second electronic element;

wherein, the plurality of signal lines are divided into a first line group and a second line group, the first line group is located between the first element group and the second element group, and the second line group is located on one side of the second element group close to the display region.

In some optional embodiments, the plurality of signal lines include: a first signal line located in the first line group and a second signal line located in the second line group;

wherein, a current on the first signal line is less than or equal to a current on the second signal line.

In some optional embodiments, the first signal line is connected to a direct current signal input end, and the direct current signal input end is configured to input a direct current signal to the first signal line; and the second signal line is connected to an alternating current signal input end, and the alternating current signal input end is configured to input an alternating current signal to the second signal line.

In some optional embodiments, an area of an orthographic projection of the first electronic element on the substrate is greater than or equal to an area of an orthographic projection of the second electronic element on the substrate.

In some optional embodiments, the driving unit includes:

a signal input end, a signal output end and a first transistor, wherein a control electrode of the first transistor is connected to the signal input end, a first electrode of the first transistor is connected to the control electrode of the first transistor or a high-level signal line, and the signal output end is connected to the gate line;

wherein a signal input end of an i-th stage driving unit is connected to a first start signal line or a signal output end of an (i-j)-th stage driving unit, both i and j are positive integers, and j is less than i.

In some optional embodiments, the first transistor is located in the second element group and disposed away from the display region, and the high-level signal line is located in the first line group and disposed close to the display region.

In some optional embodiments, the first start signal line is located in the second line group and disposed close to the display region.

In some optional embodiments, the plurality of signal lines further include:

a low-level signal line located in the first line group and disposed on one side of the high-level signal line away from the display region.

In some optional embodiments, the driving unit includes:

a signal output end, a second transistor and a capacitor, wherein a control electrode of the second transistor is connected to a first electrode of the capacitor, a first electrode of the second transistor is connected to a clock signal line, a second electrode of the second transistor is connected to a second electrode of the capacitor and the signal output end, and the signal output end is connected to the gate line;

wherein, the second transistor and the capacitor are both located in the first element group, and the clock signal line is located in the second line group.

In some optional embodiments, the driving unit includes:

a third transistor and a fourth transistor, wherein a control electrode of the third transistor and a control electrode of the fourth transistor are both connected to a second start signal line;

wherein, the third transistor and the fourth transistor are located in the second element group and disposed close to the display region, and the second start signal line is located in the second line group and disposed away from the display region.

In some optional embodiments, the plurality of signal lines include a power supply voltage signal line and a clock signal line, and the driving unit includes a plurality of transistors;

wherein, a number of transistors connected to the power supply voltage signal line is greater than a number of transistors connected to the clock signal line, the power supply voltage signal line and the clock signal line are both located in the second line group, and the power supply voltage signal line is located on one side of the clock signal line away from the display region.

In some optional embodiments, the first line group includes at least one of: a high-level signal line and a low-level signal line; and the second line group includes at least one of: the low-level signal line, a power supply voltage signal line, a clock signal line and a start signal line.

In some optional embodiments, the first element group and the second element group both include at least one of: a transistor and a capacitor.

In some optional embodiments, the driving unit includes a transistor; a control electrode of the transistor, the signal line, and the gate line are all located in a same film layer and made of a same material.

In some optional embodiments, the display baseplate includes two gate line driving circuits, the two gate line driving circuits are respectively a first gate line driving circuit and a second gate line driving circuit, the first gate line driving circuit is connected to a gate line located in an even row, and the second gate line driving circuit is connected to a gate line located in an odd row;

wherein, the first gate line driving circuit and the plurality of signal lines connected to the first gate line driving circuit are located on a first side of the display region, the second gate line driving circuit and the plurality of signal lines connected to the second gate line driving circuit are located on a second side of the display region, and the first side and the second side are two opposite sides along the first direction.

The present disclosure provides a display panel, including the display baseplate described as any one of the above embodiments.

In some optional embodiments, the display panel further includes:

a cell substrate opposite to the display baseplate; and a sealant disposed between the cell substrate and the display baseplate, wherein an orthographic projection of the sealant on the substrate is located in the peripheral region;

wherein, the driving unit further includes: a second element group located on one side of the first element group close to the display region and including at least one second electronic element; and the plurality of signal lines are divided into a first line group and a second line group, the first line group is located between the first element group and the second element group, and the second line group is located on one side of the second element group close to the display region; and the orthographic projection of the sealant on the substrate covers orthographic projections of the first element group, the first line group and at least part of the second element group on the substrate.

The present disclosure provides a display apparatus, including:

the display panel described as any one of the above embodiments; and a driving chip connected to the plurality of signal lines and configured to provide a driving signal to the plurality of signal lines.

The above description is only an overview of the technical solution of the present disclosure. In order to have a clearer understanding of the technical means of the present disclosure, it can be implemented according to the content of the specification. In order to make the above and other purposes, features, and advantages of the present disclosure more obvious and easier to understand, the specific implementation methods of the present disclosure are listed below.

BRIEF DESCRIPTION OF THE DRAWINGS

In order to provide a clearer explanation of the technical solutions in the embodiments of the present disclosure or related art, a brief introduction will be given below to the accompanying drawings required in the descriptions of the embodiments or related art. It is obvious that the accompanying drawings in the following description are some embodiments of the present disclosure. For those skilled in the art, other accompanying drawings can be obtained based on these drawings without creative labor. It should be noted that the proportions in the accompanying drawings are only for illustrative purposes and do not represent the actual proportions.

DETAILED DESCRIPTION OF THE EMBODIMENTS

In order to clarify the purpose, technical solution, and advantages of the embodiments of the present disclosure, the following will provide a clear and complete description of the technical solution in the embodiments of the present disclosure in conjunction with the accompanying drawings. Obviously, the described embodiments are a part of the embodiments of the present disclosure, not all of them. Based on the embodiments of the present disclosure, all other embodiments obtained by persons skilled in the art without creative labor fall within the scope of protection of the present disclosure.

Figure 1:
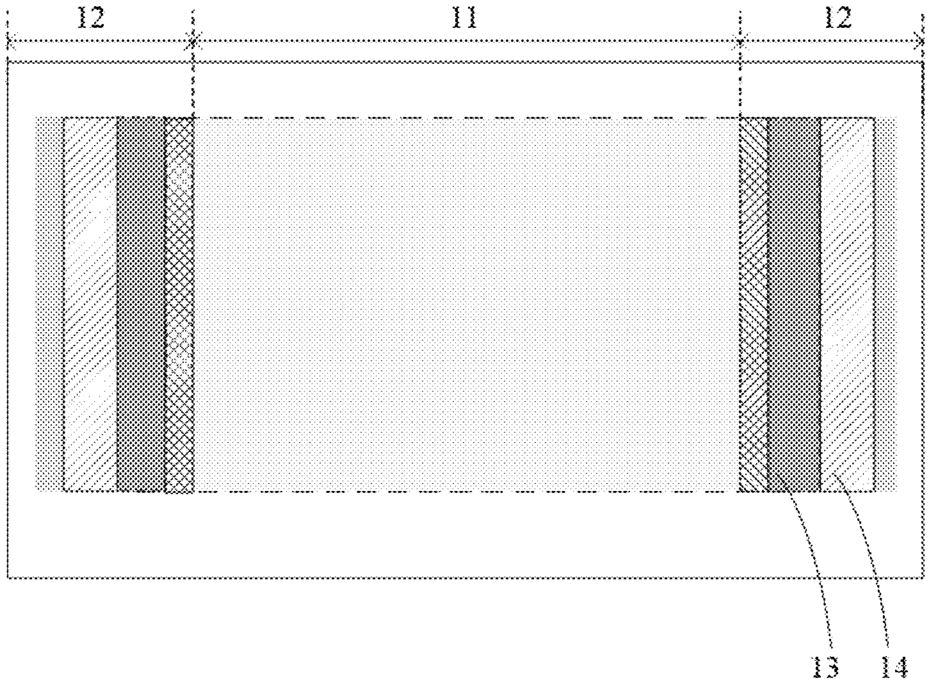
FIG. 1 schematically shows a schematic diagram of a planar structure of a display baseplate in the related art.

Referring to FIG. 1, a schematic diagram of a planar structure of a display baseplate in the related art is schematically shown. As shown in FIG. 1, the display baseplate includes a display region 11 and frame regions 12 located at both sides of the display region 11. The frame region 12 includes a gate line driving circuit region 13 and a signal line region 14. The gate line driving circuit region 13 is provided with a gate line driving circuit and the signal line region 14 is provided with a signal line, and the gate line driving circuit and the signal line are connected through a via hole.

In the related art, as shown in FIG. 1, the signal line region 14 is located at one side of the gate line driving circuit region 13 far away from the display region 11, such that a distance (the distance needs to be greater than or equal to a specified value, such as 25 mm) between the signal line and an outer edge of a sealant (not shown in the figure) is shorter, which leads to easy corrosion of a connecting via hole between the signal line and the gate line driving circuit.

Figure 2:
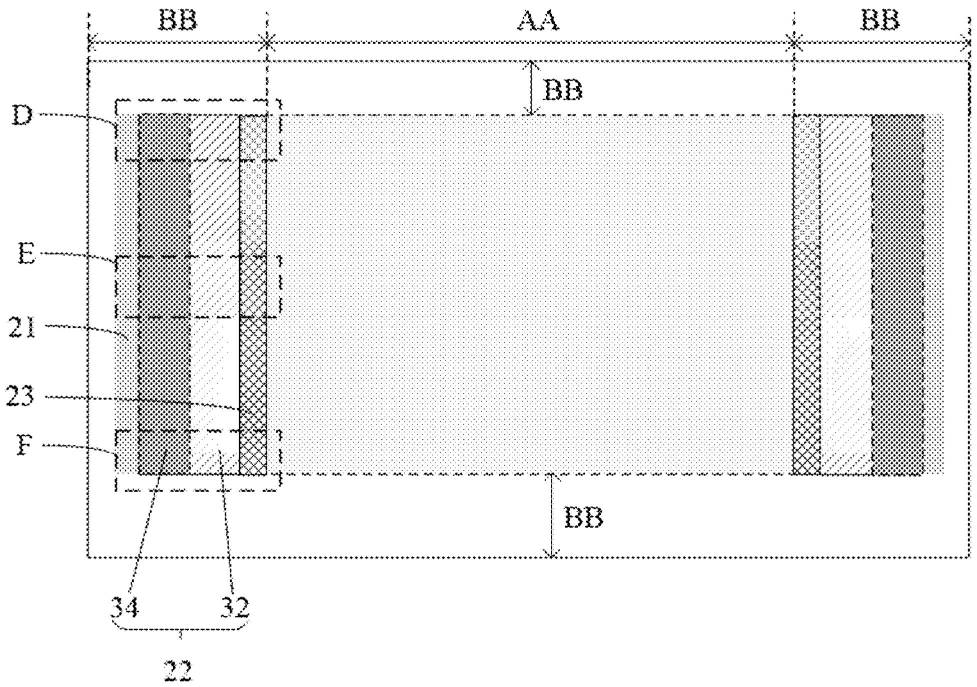
FIG. 2 schematically shows a schematic diagram of a planar structure of a display baseplate provided by the present disclosure.

In order to solve the above problems, the present disclosure provides a display baseplate. Referring to FIG. 2, a schematic diagram of a planar structure of the display baseplate provided by the present disclosure is schematically shown. As shown in FIG. 2, the display baseplate includes a display region AA and a peripheral region BB located on at least one side of the display region AA. In FIG. 2, the peripheral region BB is located around the display region AA.

Figure 3:
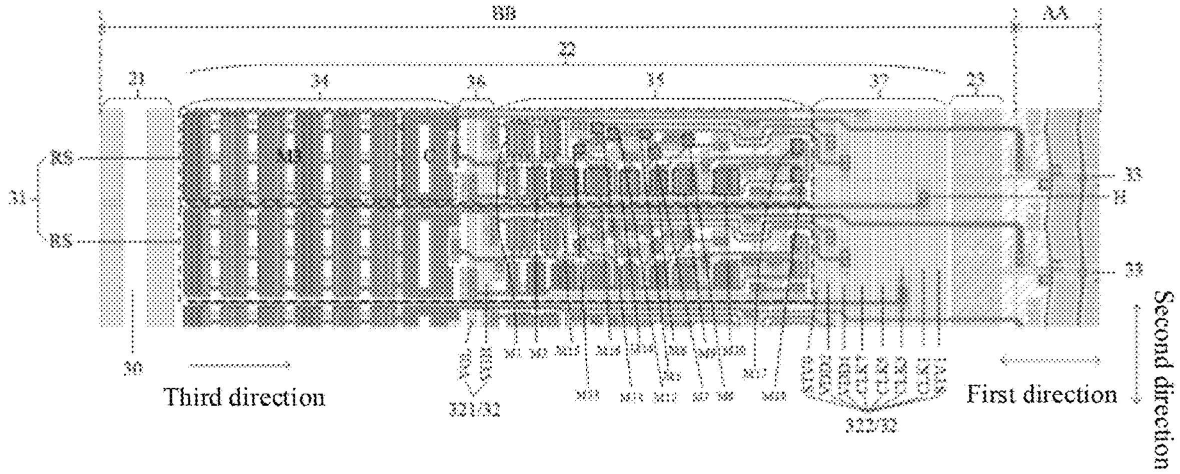
FIG. 3 schematically shows a schematic structural diagram of a dotted box E in the display baseplate provided by the present disclosure.
Figure 4:
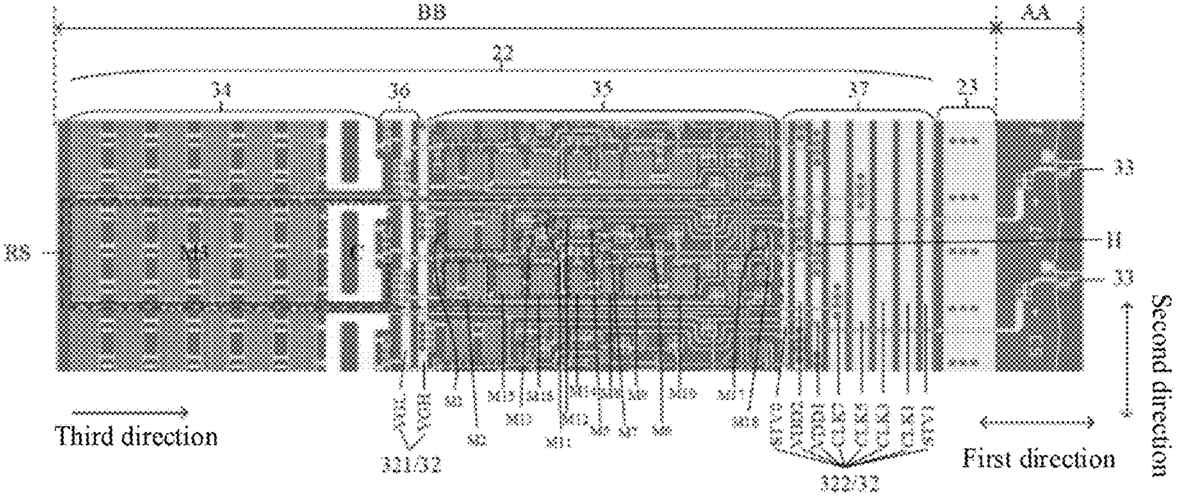
FIG. 4 schematically shows a microscope image of the dotted box E in the display baseplate provided by the present disclosure.

FIG. 3 schematically shows a schematic structural diagram of a dotted box E in the display baseplate shown in FIG. 2, and FIG. 4 is a microscope image corresponding to FIG. 3. As shown in FIG. 3 or FIG. 4, the display baseplate includes a substrate 30, and a gate line driving circuit 31, a plurality of signal lines 32, and a gate line 33 provided on one side of the substrate 30. The gate line driving circuit 31 and the plurality of signal lines 32 are all located in the peripheral region BB, and the gate line 33 is located in the display region AA.

The gate line driving circuit 31 is respectively connected to the plurality of signal lines 32 and the gate line 33, and is configured to output a scanning signal to the gate line 33 according to driving signals input by the plurality of signal lines 32.

As shown in FIG. 3, the gate line driving circuit 31 includes a plurality of stages of driving units RS that are cascaded to each other. Each driving unit RS includes a first element group 34, and the first element group 34 includes at least one first electronic element. The first electronic element is an electronic element located in the first element group 34. The first element group 34 may include at least one of the following electronic elements: a transistor, a capacitor and the like.

In a specific implementation, the first element group 34 may include one first electronic element or a plurality of first electronic elements. A number of the first electronic elements included in the first element group 34 is greater than or equal to 1 and less than or equal to a number of all electronic elements included in the driving unit RS.

The plurality of signal lines 32 are arranged in a first direction, the first direction is an extending direction of the gate line 33, and at least one among the plurality of signal lines 32 is located on one side of the first element group 34 close to the display region AA. That is, one of more signal lines 32 connected to the gate line driving circuit 31 may be located on one side of the first element group 34 in the gate line driving circuit 31 close to the display region AA.

For example, as shown in FIG. 3, the first element group 34 includes two first electronic elements, that is, a transistor M3 and a capacitor C. The driving unit RS includes 18 electronic elements including a plurality of transistors (M1 to M3, and M5 to M18 as shown in FIG. 3) and one capacitor (C as shown in FIG. 3).

According to the gate line driving circuit 31 as shown in FIG. 3, there are ten signal lines 32 connected to the gate line driving circuit 31. The ten signal lines include a high-level signal line VGH, a low-level signal line VGL, two power supply voltage signal lines VDD1 and VDD2, four clock signal lines CLK1, CLK3, CLK5 and CLK7, and two start signal lines STV0 and STV1.

All the signal lines (i.e., the 10 signal lines 32) connected to the gate line driving circuit 31 shown in FIG. 3 are all located on one side of the first element group 34 in the gate line driving circuit 31 close to the display region AA.

In a specific implementation, a number of signal lines located on one side of the first element group 34 close to the display region AA is greater than or equal to 1, and less than or equal to a total number of signal lines connected to the same gate line driving circuit 31.

In a specific implementation, as shown in FIG. 3 or FIG. 4, the gate line driving circuit 31 and the signal line 32 are connected through a via hole H.

In the display baseplate provided by the present disclosure, one or more signal lines 32 connected to the gate line driving circuit 31 are disposed on one side of the first element group 34 close to the display region AA, so that the distance between the one or more signal lines 32 and the outer edge of the sealant can be increased, and the probability of corrosion of the connecting via hole between these signal lines 32 and the gate line driving circuit 31 can be further reduced, a high-temperature life of the display baseplate can be prolonged, and a quality and a reliability of the display product can be improved. Moreover, the distance between the signal line and the outer edge of the sealant can be increased without increasing a width of the frame, which is helpful to realize a narrow frame.

In some embodiments, as shown in FIG. 3, the gate lines 33 located in the display region AA extend in the first direction, and a plurality of gate lines 33 are arranged in a second direction. Alternatively, the signal line 32 may extend along the second direction, and the first direction and the second direction intersect or are perpendicular to each other (as shown in FIG. 3).

In some embodiments, in the gate line driving circuit 31 as shown in FIG. 3, a plurality of stages of driving units RS are arranged in the second direction.

In some embodiments, at least one among the plurality of signal lines 32 is located on one side of the driving unit RS close to the display region AA. That is, one or more signal lines 32 connected to the gate line driving circuit 31 may be located on one side of the driving unit RS in the gate line driving circuit 31 close to the display region AA.

Exemplarily, according to the gate line driving circuit 31 as shown in FIG. 3, there are ten signal lines connected to the gate line driving circuit 31, wherein eight signal lines including two power supply voltage signal lines VDD1 and VDD2, four clock signal lines CLK1, CLK3, CLK5 and CLK7, and two start signal lines STV0 and STV1, are all located at one side of the driving unit RS close to the display region AA.

One or more signal lines 32 connected to the gate line driving circuit 31 are disposed on one side of the driving unit RS close to the display region AA in the gate line driving circuit 31, so that the distance between the one or more signal lines 32 and the outer edge of the sealant can be further increased, and the probability of corrosion of the connecting via hole between these signal lines 32 and the gate line driving circuit 31 can be further reduced, the high-temperature life of the display baseplate can be prolonged, and the quality and the reliability of the display product can be improved.

In a specific implementation, all the signal lines 32 connected to the gate line driving circuit 31 may be located at one side of the driving unit RS in the gate line driving circuit 31 close to the display region AA, so that the probability of corrosion of the connecting via hole between the signal lines 32 and the gate line driving circuit 31 can be minimized. Alternatively, part of the signal lines (i.e., one or more signal lines, such as eight of the ten signal lines shown in FIG. 3) connected to the gate line driving circuit 31 are located at one side of the driving unit RS in the gate line driving circuit 31 close to the display region AA. In this case, other signal lines 32 can be arranged according to the requirements of wiring space, which is not limited in the present disclosure.

In some embodiments, as shown in FIG. 3, the driving unit RS further includes: a second element group 35 located on one side of the first element group 34 close to the display region AA and including at least one second electronic element.

In this embodiment, the plurality of signal lines 32 connected to the same gate line driving circuit 31 are divided into a first line group 36 and a second line group 37. The first line group 36 is located between the first element group 34 and the second element group 35, and the second line group 37 is located on one side of the second element group 35 close to the display region AA.

The second electronic element is an electronic element located in the second line group 37. The second element group 35 may include at least one of the following electronic elements: a transistor and a capacitor.

In a specific implementation, the second line group 37 may include one second electronic element or a plurality of second electronic elements. A number of the second electronic elements included in the second line group 37 is greater than or equal to 1 and less than a number of all electronic elements included in the driving unit RS.

For example, as shown in FIG. 3, the second element group 35 includes 16 second electronic elements, i.e., transistors M1 to M2, and M5 to M18. The driving unit RS includes 18 electronic elements including a plurality of transistors including (M1 to M3, and M5 to M18 as shown in FIG. 3) and one capacitor (C as shown in FIG. 3).

For example, as shown in FIG. 3, the first line group 36 includes two signal lines 32, i.e., a high-level signal line VGH and a low-level signal line VGL. The second line group 37 includes eight signal lines 32, i.e., two power supply voltage signal lines VDD1 and VDD2, four clock signal lines CLK1, CLK3, CLK5 and CLK7, and two start signal lines STV0 and STV1.

As shown in FIG. 3, the first element group 34 is disposed on an outer side of the second element group 35 (i.e., one side close to an edge of the display baseplate), the first line group 36 is disposed between the first element group 34 and the second element group 35, and the second line group 37 is disposed on an inner side of the second element group 35 (i.e., one side close to the display region AA). As shown in FIG. 3, in a direction close to the display region AA (in a third direction as shown in FIG. 3), the first element group 34, the first line group 36, the second element group 35, and the second line group 37 are sequentially arranged.

In this embodiment, part of the signal lines 32 (i.e., the signal lines 32 in the second line group 37) connected to the gate line driving circuit 31 are located on one side of the driving unit RS in the gate line driving circuit 31 close to the display region AA. Other signal lines 32 (i.e., the signal lines 32 in the first line group 36) are disposed between the first element group 34 and the second element group 35.

In some embodiments, the plurality of signal lines 32 include: a first signal line 321 located in the first line group 36, and a second signal line 322 located in the second line group 37. A current on the first signal line 321 is less than or equal to a current on the second signal line 322.

Because the via hole connected to the signal line 32 with a high current is more likely to corrode, by arranging the second signal lines 322 with high current in the second signal line 37 closer to the display region AA, the distance between the second signal line 322 and the outer edge of the sealant can be increased, thus effectively reducing the probability of corrosion of the via hole on the second signal line 322.

In some embodiments, the first signal line 321 is connected to a direct current signal input end (not shown in the figure), and configured to input a direct current signal to the first signal line 321. The direct current signal may be, for example, a high-level direct current signal or a low-level direct current signal, and the like.

Since the direct current signal does not switch between high and low-levels, there is basically no current on the first signal line 321 for transmitting the direct current signal. Even if the first signal line 321 is placed in the first line group 36 close to the outer side, a corrosion risk will not be increased. At the same time, a distance between the second line group 37 and the outer edge of the sealant can be further increased, and the corrosion risk of the via hole connecting the second signal line 322 can be reduced.

In some embodiments, as shown in FIG. 3, the first line group 36 includes at least one of the following signal lines: signal lines 32 such as the high-level signal line VGH and the low-level signal line VGL for transmitting the direct current signal. The high-level signal line VGH is configured to transmit the high-level direct current signal. The low-level signal line VGL is configured to transmit the low-level direct current signal.

For example, as shown in FIG. 3, the first line group 36 includes two first signal lines 321, i.e., the high-level signal line VGH and the low-level signal line VGL.

In some embodiments, the second signal line 322 is connected to an alternating current signal input end (not shown in the figure), and the alternating current signal input end is configured to input an alternating current signal to the second signal line 322. The alternating current signal may be, for example, a pulse square wave signal, or the like.

Since the alternating current signal frequently switches between high and low-levels, there is a larger current on the second signal line 322 for transmitting the alternating current signal. By arranging the second signal line 322 in the second line group 37 close to the inner side, the distance between the second signal line 322 and the outer edge of the sealant can be increased, and the probability of corrosion can be reduced.

In some embodiments, the second line group 37 includes at least one of the following signal lines: signal lines 32 such as the power supply voltage signal line VDD, the clock signal line CLK and the start signal line STV for transmitting the alternating current signal.

Unless otherwise specified herein, the power supply voltage signal line VDD may be any one of the two power voltage signal lines VDD1 and VDD2 shown in FIG. 3, the clock signal line CLK may be any one of the four clock signal lines CLK1, CLK3, CLK5 and CLK7 shown in FIG.

3, and the start signal line STV may be any one of the two start signal lines STV0 and STV1 shown in FIG. 3.

For example, as shown in FIG. 3, the second line group 37 includes eight second signal lines 322, i.e., two power supply voltage signal lines VDD1 and VDD2, four clock signal lines CLK1, CLK3, CLK5 and CLK7, and two start signal lines STV0 and STV1.

In some embodiments, as shown in FIG. 3, an area of an orthographic projection of the first electronic element on the substrate 30 is greater than or equal to an area of an orthographic projection of the second electronic element on the substrate 30.

By placing the first electronic element occupying a larger space in the first element group 34 farther from the display region AA, the distance between each signal line 32 and the outer edge of the sealant can be further increased, and the corrosion risk of the connecting via hole is reduced, which is helpful to reduce the width of the frame.

Figure 6:
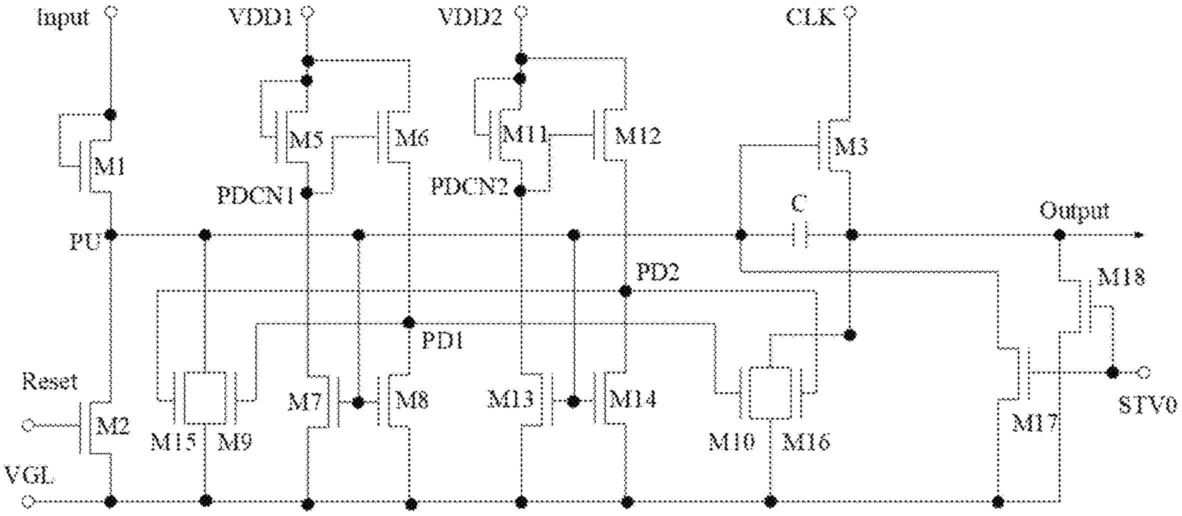
FIG. 6 schematically shows a first schematic diagram of a circuit structure of a driving unit.
Figure 7:
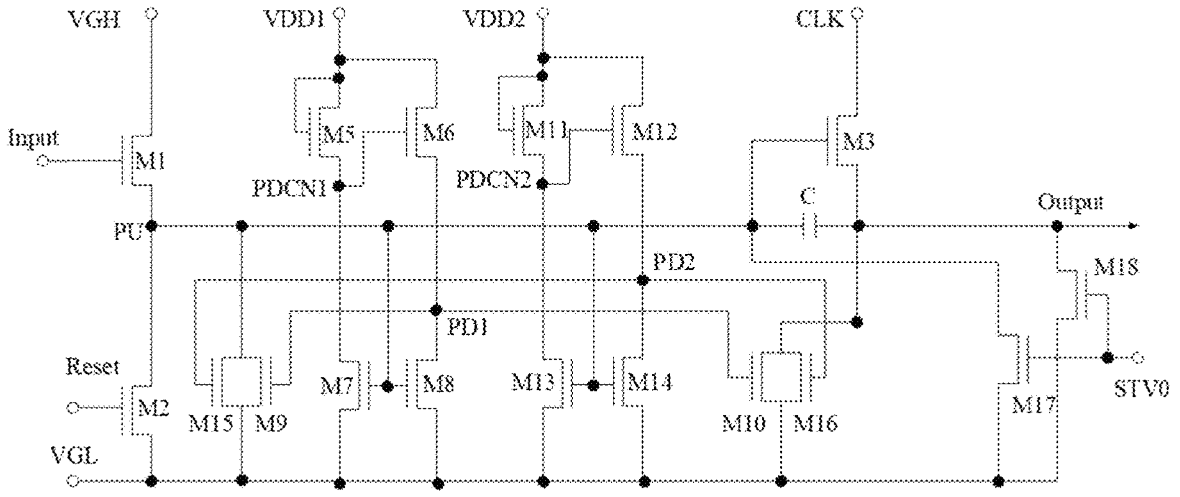
FIG. 7 schematically shows a second schematic diagram of the circuit structure of the driving unit.

In some embodiments, referring to FIG. 6 and FIG. 7, two schematic structures of a circuit structure of the driving unit are shown. As shown in FIG. 6 and FIG. 7, the driving unit RS includes: a signal input end Input, a signal output end Output and a first transistor M1, wherein a control electrode of the first transistor M1 is connected to the signal input end Input, a first electrode of the first transistor M1 is connected to a control electrode (as shown in FIG. 6) of the first transistor M1 or a high-level signal line VGH (as shown in FIG. 7), and the signal output end Output is connected to the gate line 33.

Figure 9:
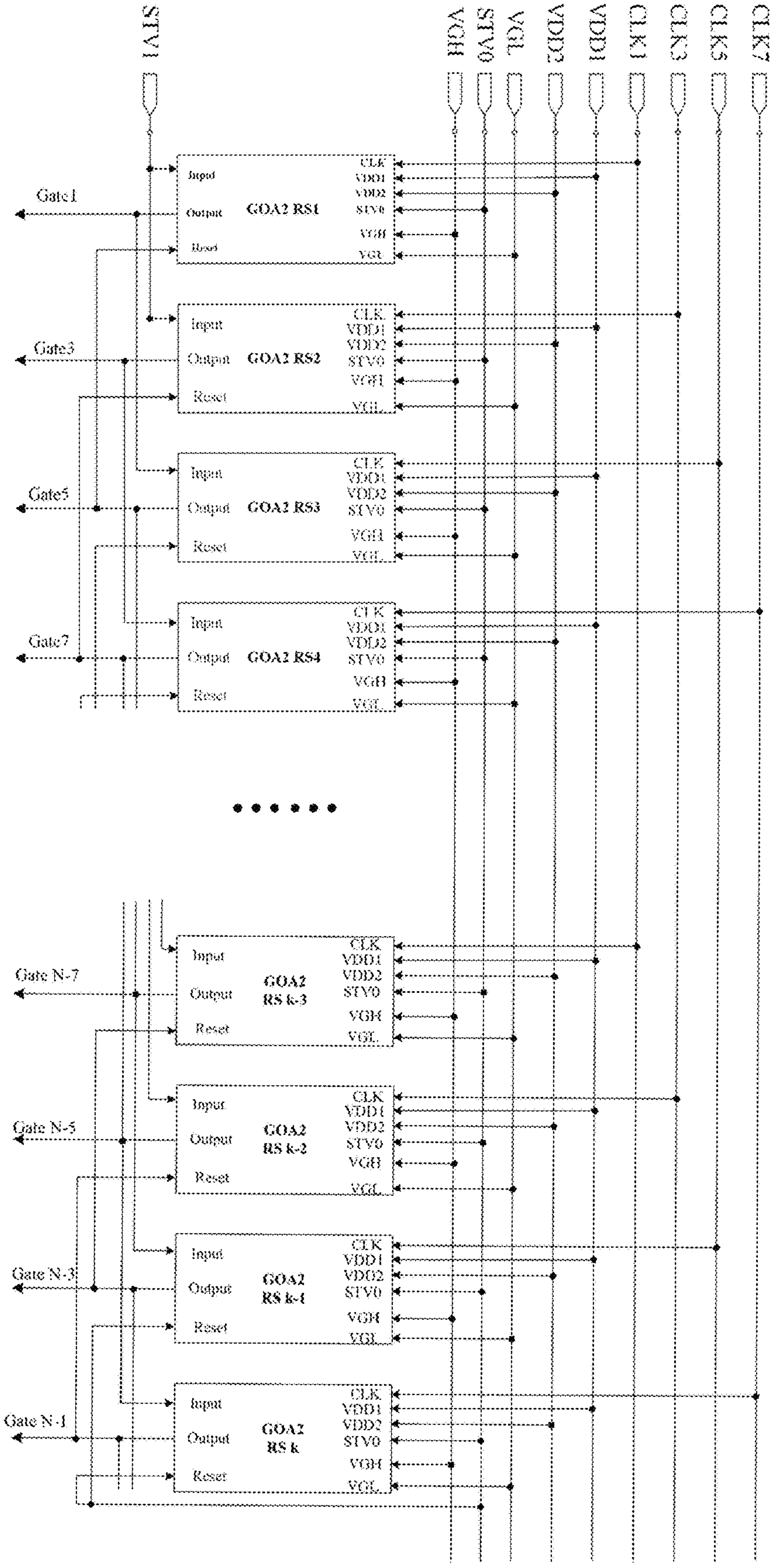
FIG. 9 schematically shows a schematic diagram of a circuit structure of a second gate line driving circuit.

Referring to FIG. 9, a signal input end Input of an i-th stage driving unit RS i is connected to a first start signal line STV1 or a signal output end Output of an (i-j)-th stage driving unit RS i-j, both i and j are positive integers, and j is less than i.

Specifically, when i is less than or equal to j, the signal input end Input of the i-th stage driving unit RS i may be connected to the first start signal line STV1. When i is greater than j, the signal input end Input of the i-th stage driving unit RS i is connected to the signal output end Output of the (i-j)-th stage driving unit RS i-j.

In FIG. 9, j is equal to 2, that is, signal input ends Input of a first stage driving unit RS 1 and a second stage driving unit RS 2 are connected to the first start signal line STV1. A signal input end Input of a third stage driving unit RS 3 is connected to a signal output end Output of the first stage driving unit RS 1, a signal input end Input of a fourth stage driving unit RS 4 is connected to a signal output end Output of the second stage driving unit RS 2, and so on.

As shown in FIG. 9, the plurality of stages of driving units RS may be respectively connected to different gate lines 33. In FIG. 9, the driving units RS are connected to the gate lines 33 in one-to-one correspondence.

As shown in FIG. 6 and FIG. 7, a second electrode of the first transistor M1 is connected to a pull-up node PU, and the first transistor M1 is configured to switch on or off connection between the first electrode and the second electrode according to a signal of the control electrode, and write the signal of the first electrode into the pull-up node PU when the first electrode and the second electrode are switched on.

Optionally, as shown in FIG. 6, the first electrode of the first transistor M1 is connected to the control electrode of the first transistor M1. When the signal input end Input of the i-th stage driving unit RS i is connected to the signal output end Output of the (i-j)-th stage driving unit RS i-j, the first electrode of the first transistor M1 is connected to the signal output end Output of the (i-j)-th stage driving unit RS i-j. As the signal output end Output is also connected to the gate line 33, a sub-pixel load in the display region AA is large, so that a signal output by the signal output end Output is delayed, and a signal of the pull-up node PU in the i-th stage driving unit RS i is thereby delayed, which affects charging of the pull-up node PU, and the display baseplate shown in FIG. 6 is prone to display failure after a reliability test.

In order to solve the above problems, as shown in FIG. 7, optionally, the first electrode of the first transistor M1 is connected to the high-level signal line VGH. When the first transistor M1 is turned on, the first electrode and the second electrode are switched on, so that the high-level signal input from the high-level signal line VGH may be written into the pull-up node PU to charge the pull-up node PU. Because the high-level signal line VGH is a high-level signal source, which is not connected to a load and has no delay, even if a threshold voltage of the first transistor M1 drifts after the reliability test, the pull-up node PU can be charged to a high-level in a limited time, thus improving the reliability of the product.

Figure 10:
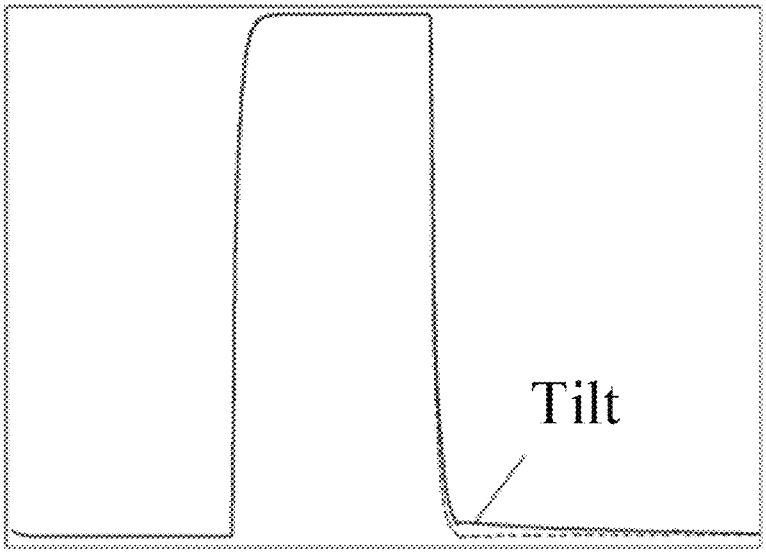
FIG. 10 schematically shows two analog waveforms output by a signal output end of the driving unit after a high-temperature test is completed.

Referring to FIG. 10, the inventors conducted a high-temperature test of 85° C. and 40 hours on the driving unit shown in FIG. 7 (dotted line in FIG. 10), and conducted a high-temperature test of 85° C. and 20 hours on the driving unit shown in FIG. 6 (solid line in FIG. 10). FIG. 10 shows two analog waveforms output by the signal output end of the driving unit after the high-temperature test is completed. By comparison, it is found that delay of the analog waveform output by the signal output end Output of the driving unit shown in FIG. 7 is small, and a falling edge of the analog waveform output by the signal output end Output of the driving unit shown in FIG. 6 has a significant tilt, which shows a significant delay, and as the high temperature test time is prolonged, the tilt will be higher and higher, which finally results in abnormal display of the display baseplate.

The inventors also used simulation software to simulate the service life of the display baseplate with two driving unit structures as shown in FIG. 6 and FIG. 7 under the high-temperature test. By comparison, it is found that the service life of the display baseplate can be increased from 50 hours to 20,000 hours with the structure shown in FIG. 7, thus effectively improving the high-temperature reliability and the service life of the display baseplate.

In some embodiments, as shown in FIG. 3, the first transistor M1 is located in the second element group 35 and disposed away from the display region AA, and the high-level signal line VGH is located in the first line group 36 and disposed close to the display region AA.

As the high-level signal line VGH is only connected to the first transistor M1, by disposing the high-level signal line VGH in the first line group 36 and close to the first transistor M1, as shown in FIG. 3, the wiring space can be saved and the width of the frame can be reduced.

In some embodiments, as shown in FIG. 3, the first start signal line STV1 is located in the second line group 37 and disposed close to the display region AA.

In some embodiments, as shown in FIG. 3, the plurality of signal lines 32 further include: a low-level signal line VGL located in the first line group 36 and disposed on one side of the high-level signal line VGH away from the display region AA. It is found through test that by disposing the low-level signal line VGL in the first line group 36, a length of a connection line between the electronic element and the low-level signal line VGL can be reduced, and power consumption of the line can be reduced.

It should be noted that the low-level signal line VGL may also be disposed in the first line group 36 and located on one side of the high-level signal line VGH close to the display region AA as required, or disposed in the second line group 37, which is not limited in the present disclosure.

In some embodiments, as shown in FIG. 6 and FIG. 7, the driving unit RS includes: a signal output end Output, a second transistor M3 and a capacitor C, wherein a control electrode of the second transistor M3 is connected to a first electrode of the capacitor C, a first electrode of the second transistor M3 is connected to the clock signal line CLK, a second electrode of the second transistor M3 is connected to a second electrode of the capacitor C and the signal output end Output, and the signal output end Output is connected to the gate line 33.

As shown in FIG. 3, both the second transistor M3 and the capacitor C are located in the first element group 34, and the clock signal line CLK is located in the second line group 37.

Because the second electrode of the second transistor M3 is connected to the signal output end Output, and the signal output end Output is also connected to the gate line 33, the sub-pixel load in the display region AA is relatively large. Therefore, compared with other transistors, the second transistor M3 may have a relatively large channel width-length ratio, so that the second transistor has a relatively large on-state current to improve a carrying capacity thereof.

As shown in FIG. 3, as the channel width to length ratio of the second transistor M3 is relatively large, the second transistor occupies more space than other transistors. The second transistor M3 may be disposed in the first element group 34. In order to improve a charge storage capacity of the capacitor C, a larger plate area may be set, resulting in a larger space occupied by the capacitor C. Therefore, the capacitor C may be disposed in the first element group 34.

In some embodiments, as shown in FIG. 6 and FIG. 7, the driving unit RS includes: a third transistor M17 and a fourth transistor M18. A control electrode of the third transistor M17 and a control electrode of the fourth transistor M18 are both connected to the second start signal line STV0.

As shown in FIG. 3, the third transistor M17 and the fourth transistor M18 are located in the second element group 35 and disposed close to the display region AA, and the second start signal line STV0 is located in the second line group 37 and disposed away from the display region AA.

By arranging the second start signal line STV0 in the second line group 37 and close to the third transistor M17 and the fourth transistor M18, with no other signal lines 32 in the middle, a length of a connection line connecting the second start signal line STV0 with the third transistor M17 or the fourth transistor M18 can be reduced, and line losses are reduced. At the same time, via hole connection is avoided (when other signal lines are spaced between the second start signal line STV0 and the third transistor M17 and the fourth transistor M18, in order to prevent short circuit, the connection line between the second start signal line STV0 and the third transistor M17 or the fourth transistor M18 needs to be connected to other film layers through a via hole to cross other signal lines), which saves the wiring space and reduces the width of the frame.

In order to further reduce a number of via holes, the control electrode of the third transistor M17, the control electrode of the fourth transistor M18 and the second start signal line STV0 may all be disposed in a same film layer and made of a same material.

In some embodiments, the plurality of signal lines 32 include the power supply voltage signal line VDD and the clock signal line CLK. The driving unit RS includes a plurality of transistors (such as 17 transistors M1 to M3 and M5 to M18 shown in FIG. 3)

As shown in FIG. 6 and FIG. 7, a number of the transistors connected to the power supply voltage signal line VDD is greater than a number of the transistors connected to the clock signal line CLK, both the power supply voltage signal line VDD and the clock signal line CLK are located in the second line group 37, and the power supply voltage signal line VDD is located on one side of the clock signal line CLK away from the display region AA.

Since the number of the transistors connected to the power supply voltage signal line VDD is more than the number of the transistors connected to the clock signal line CLK, by arranging the power supply voltage signal line VDD at the position of the clock signal line CLK close to the first element group 34 and the second element group 35, the wiring space can be saved, the length of the connection line can be shortened, and the line loss can be reduced.

As shown in FIG. 6 and FIG. 7, the number of the transistors connected to the power supply voltage signal line VDD 1 is 2 (M5 and M6 as shown in FIG. 6 and FIG. 7), the number of the transistors connected to the power supply voltage signal line VDD 2 is 2 (M11 and M12 shown as in FIG. 6 and FIG. 7), and the number of the transistors connected to the clock signal line CLK is 1 (M3 as shown in FIG. 6 and FIG. 7), that is, the number of the transistors connected to the power supply voltage signal line VDD is greater than the number of the transistors connected to the clock signal line CLK.

For example, as shown in FIG. 3, the two power supply voltage signal lines VDD 1 and VDD 2 are located on one sides of the four clock signal lines CLK 1, CLK 3, CLK 5, and CLK 7 away from the display region AA.

In some embodiments, the driving unit RS includes a transistor, wherein a control electrode of the transistor, the signal line 32, and the gate line 33 are all located in a same film layer and made of a same material.

In a specific implementation, the signal line 32 may also be located in a same film layer and made of a same material as that of a first electrode and a second electrode of the transistor, which is not limited in the present disclosure.

Figure 8:
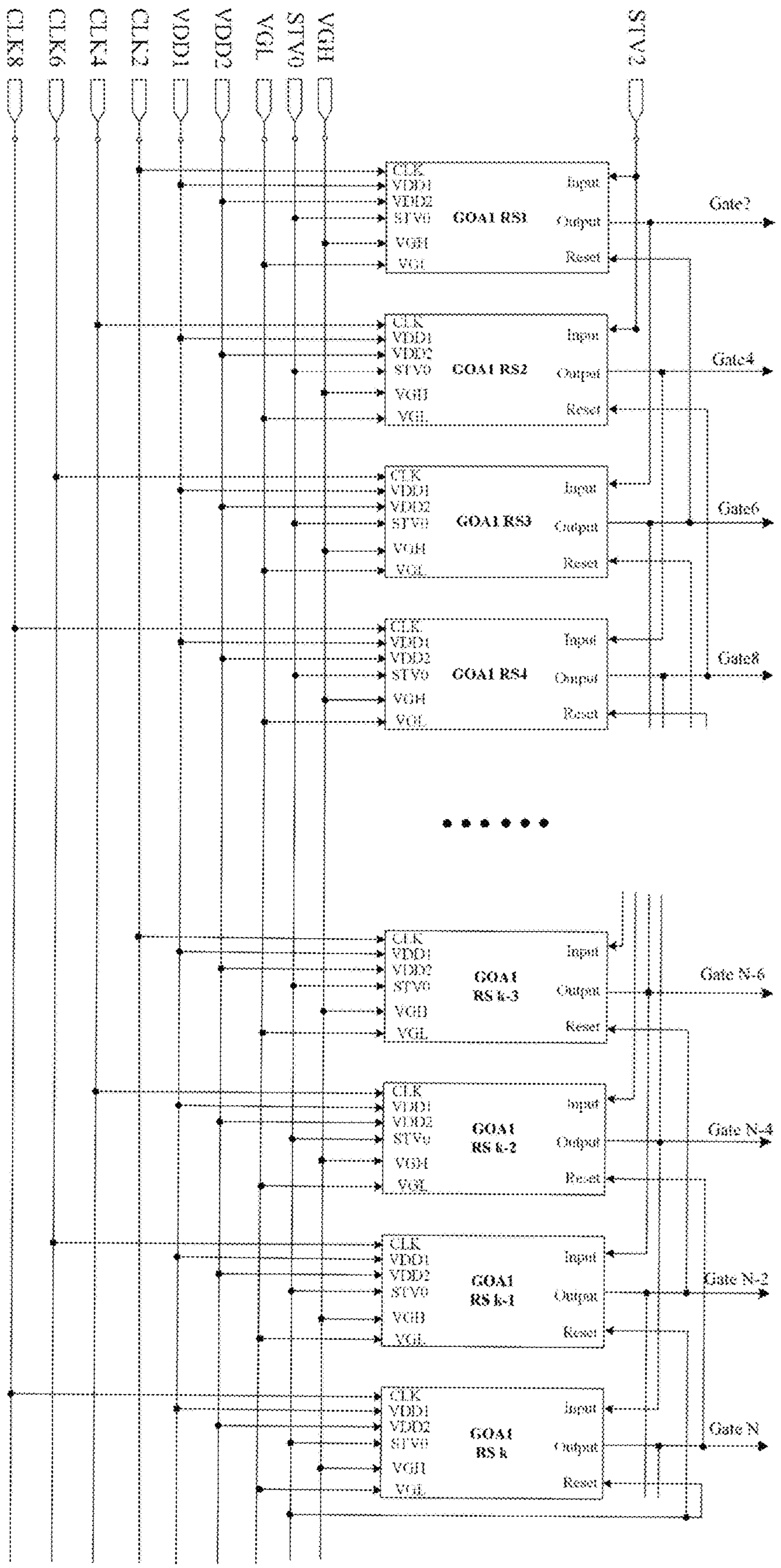
FIG. 8 schematically shows a schematic diagram of a circuit structure of a first gate line driving circuit.

In a specific implementation, the display baseplate may include one or a plurality of gate line driving circuits 31 mentioned above. The plurality of gate line driving circuits 31 are respectively connected to different signal lines 32, that is, the signal lines 32 connected to different gate line driving circuits 31 are different. Refer to FIG. 8 and FIG. 9 which show a cascade relationship of the two gate line driving circuits 31 driven alternately at both sides.

In some embodiments, the display baseplate includes two gate line driving circuits 31. The two gate line driving circuits 31 are respectively a first gate line driving circuit GOAL (as shown in FIG. 8) and a second gate line driving circuit GOA2 (as shown in FIG. 9). The first gate line driving circuit GOAL is connected with gate lines 33 located in an even row (gate2, gate4 . . . , as shown in FIG. 8), and the second gate line driving circuit GOA2 is connected to gate lines 33 located in an odd row (gate1, gate3 . . . , as shown in FIG. 9).

The first gate line driving circuit GOA1 and the plurality of signal lines 32 connected to the first gate line driving circuit GOAL are located on a first side of the display region AA (as a right side of the display region AA shown in FIG. 2), the second gate line driving circuit GOA2 and the plurality of signal lines 32 connected to the second gate line driving circuit GOA2 are located on a second side of the display region AA (as a left side of the display region AA shown in FIG. 2), and the first side and the second side are two opposite sides along the first direction.

Optionally, the first gate line driving circuit GOA1 (as shown in FIG. 8) and the second gate line driving circuit GOA2 (as shown in FIG. 9) both include a plurality of driving units RS 1 to RS k that are cascaded to each other.

As shown in FIG. 8 and FIG. 9, when the gate line driving circuit 31 includes k stages of driving units RS, and p is less than or equal to k-j, a reset signal end Reset of a p-th stage driving unit RS p is connected to a signal output end Output of a (p+j)-th stage driving unit RS p+j. When p is greater than k-j, the reset signal end Reset of the p-th stage driving unit RS is connected to the second start signal line STV0, wherein k, p and j are all positive integers, and p and j are both less than k. In FIG. 8 and FIG. 9, j is equal to 2.

Figure 11:
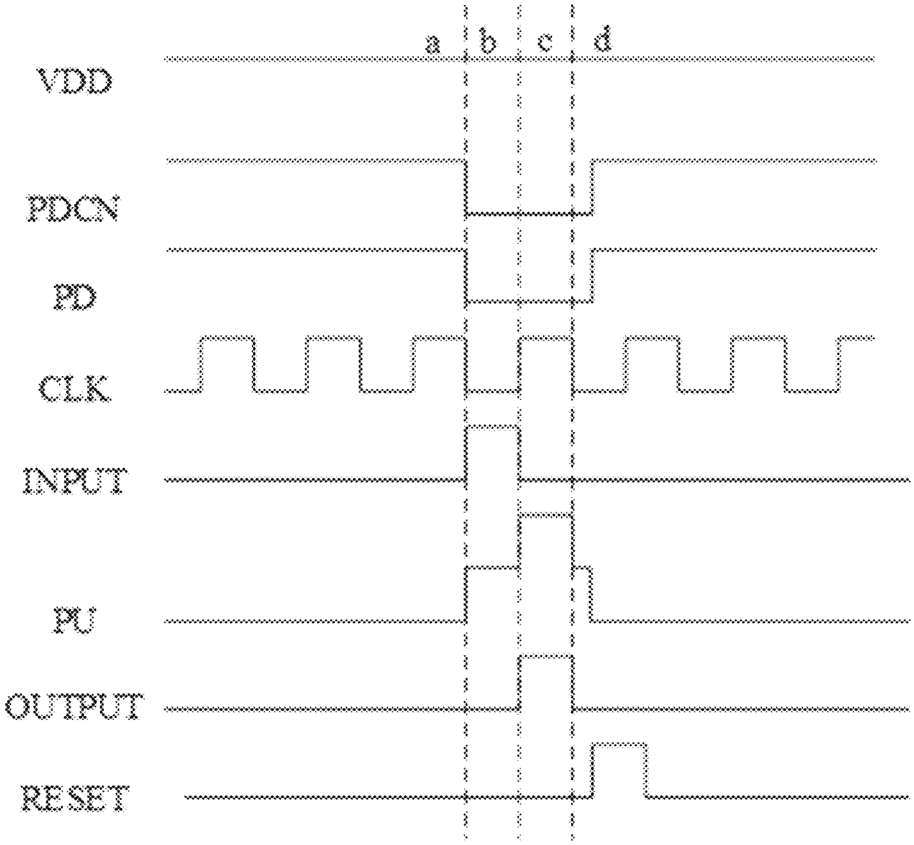
FIG. 11 schematically shows a timing diagram of an input/output signal of the driving unit.

A working process of the driving unit shown in FIG. 7 will be explained below. FIG. 11 illustrates a timing diagram of various signals at different stages. The driving unit shown in FIG. 7 includes four stages in a refresh cycle: a stage a, a stage b, a stage c and a stage d.

In the stage a, the signal input end Input inputs a low-level signal, the transistor M1 is turned off, and the power supply voltage signal lines VDD1 and VDD2 reduce noise of the driving unit.

In the stage b, the signal input end Input inputs a high-level signal, the transistor M1 is turned on, the high-level signal line VGH charges the pull-up node PU to a high-level through the transistor M1, the transistor M3 is turned on, and the signal output end Output outputs a low-level of the clock signal line CLK (corresponding to CLK1, CLK3, CLK5 or CLK7 in FIG. 9, the same as below).

In the stage c, the signal input end Input inputs a low-level signal, the transistor M1 is turned off, the clock signal line CLK is at a high-level, the pull-up node PU is bootstrapped to a higher level, the transistor M3 is still turned on, and the signal output end Output outputs a high-level of the clock signal line CLK.

In the stage d, in the former part, the reset signal end Reset inputs a low-level signal, the clock signal line CLK is at a low-level, the pull-up node PU is still at a high-level, the transistor M3 is turned on, and the signal output end Output outputs the low-level of the clock signal line CLK. In the latter part, the reset signal end Reset inputs a high-level signal, the transistor M2 is turned on, and the low-level signal line VGL pulls the pull-up node PU to a low-level.

Figure 5:
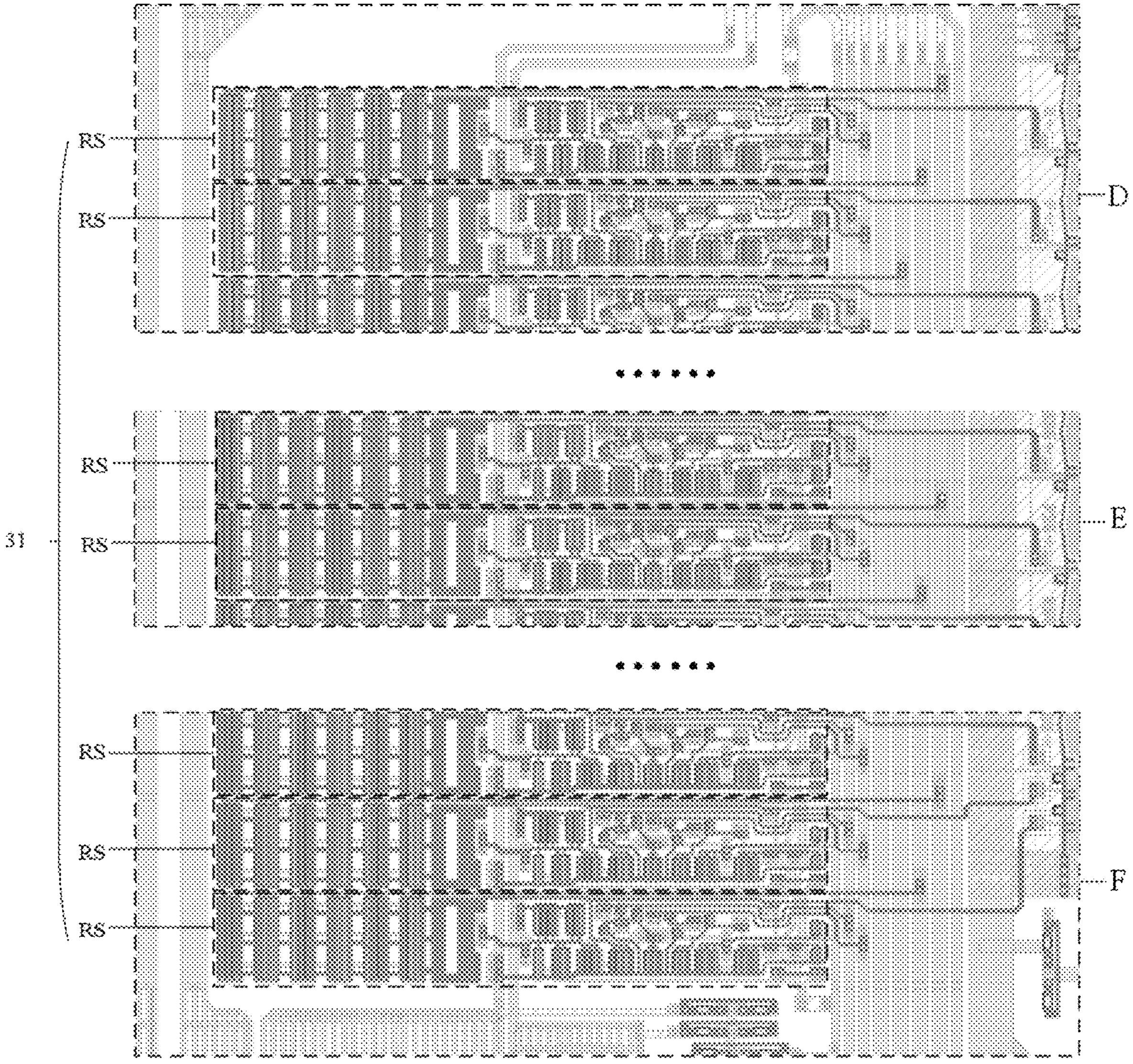
FIG. 5 schematically shows a schematic structural diagram of dotted boxes D, E and F in the display baseplate provided by the present disclosure.

FIG. 5 illustrates a schematic structural diagram of the second gate line driving circuit GOA2 located at the left side of FIG. 2 in dotted boxes D, E and F.

As shown in FIG. 2 and FIG. 3, the first element group 34, the first line group 36, the second element group 35 and the second line group 37 may be located in a second wiring region 22.

As shown in FIG. 2 and FIG. 3, the display baseplate may further include: a first wiring region 21 located on one side of the second wiring region 22 away from the display region AA; and a third wiring region 23 located between the second wiring region 22 and the display region AA. The first wiring region 21 may be provided with a first common voltage wire ground wire and the like, and the second wiring region 23 may be provided with a second common voltage wire and the like.

Figure 12:
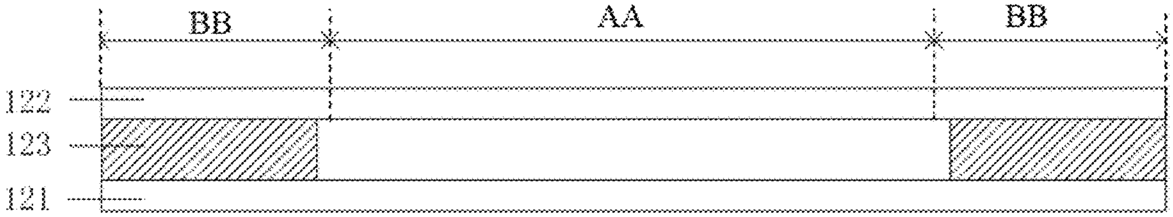
FIG. 12 schematically shows a schematic diagram of a cross-sectional structure of a display panel.

The present disclosure provides a display panel, referring to FIG. 12, including the display baseplate 121 provided in any one of the above embodiments.

Those skilled in the art can understand that the display panel has the advantages of the previous display baseplate.

The display panel provided by the present disclosure may be a liquid crystal display panel, an Organic Light Emitting Diode (OLED) display panel, a Quantum Dot Light-Emitting Diode (QLED) display panel, a Mini Light-Emitting Diode (Mini LED) display panel, a Micro Light-Emitting Diode (Micro LED) display panel, a Polymer Light-Emitting Diode (PLED) display panel, a Plasma Display Panel (PDP), etc. A specific type of the display panel is not particularly limited herein.

In some embodiments, as shown in FIG. 12, the display panel further includes: a cell substrate 122 opposite to the display baseplate 121; and a sealant 123 disposed between the cell substrate 122 and the display baseplate 121, wherein an orthographic projection of the sealant 123 on the substrate is located in the peripheral region BB.

As shown in FIG. 3, the driving unit RS includes a first element group 34 and a second element group 35. A plurality of signal lines 32 connected to the same gate line driving circuit 31 are divided into a first line group 36 and a second line group 37. The second element group 35 is located on one side of the first element group 34 close to the display region AA, the first line group 36 is located between the first element group 34 and the second element group 35, and the second line group 37 is located on one side of the second element group 35 close to the display region AA.

Figure 13:
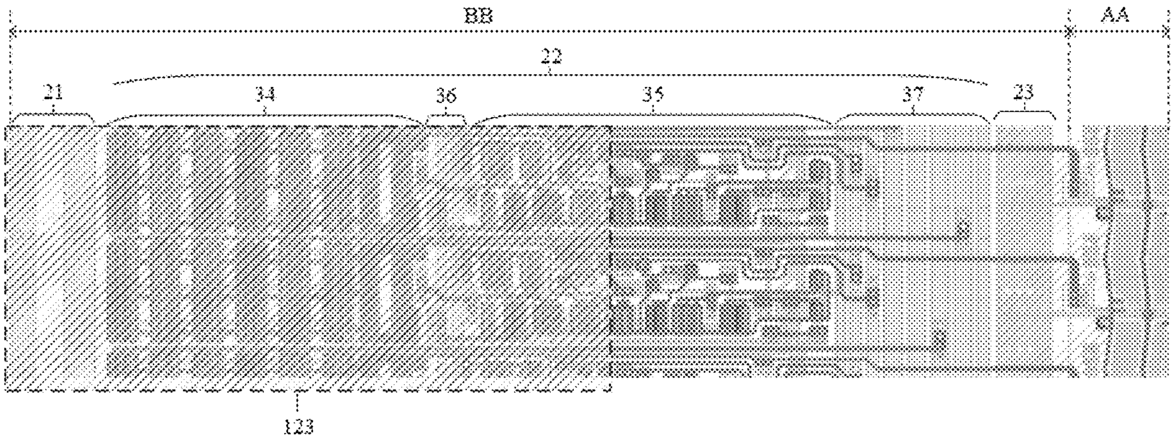
FIG. 13 schematically shows a schematic diagram of a partial planar structure of the display panel.

As shown in FIG. 13, the orthographic projection of the sealant 123 on the substrate covers orthographic projections of the first element group 34, the first line group 36 and at least part of the second element group 35 on the substrate.

The present disclosure provides a display apparatus, including the display panel provided by any one of the above embodiments.

Those skilled in the art can understand that the display apparatus has the advantages of the previous display baseplate.

The display apparatus provided by the present disclosure may further include a driving chip connected to the plurality of signal lines and configured to provide a driving signal to the plurality of signal lines. An orthographic projection of the driving chip on the display baseplate may be located in the peripheral region.

If the display panel is a liquid crystal display panel, the display apparatus may further include a backlight module disposed at a backlight side of the liquid crystal display panel to provide backlight.

The display apparatus provided by the present disclosure may include, for example, any product or member with display function, such as a mobile phone, a tablet computer, a TV set, a notebook computer, a digital photo frame, a navigator, and a vehicle-mounted display product.

In the present disclosure, "plurality of" means two or more, and "at least one" means one or more, unless otherwise specified.

In the present disclosure, orientation or positional relationships indicated by the terms "up", "down", etc. are on the basis of the orientation or positional relationships shown in the accompanying drawings, only for the convenience of describing and simplifying the description of the present disclosure, and not to indicate or imply that the device or component referred to must have a specific orientation, be constructed and operated in a specific orientation, and therefore cannot be understood as a limitation of the present disclosure.

In the claims, any reference symbol between parentheses should not be constructed as a limitation on the claims.

In this specification, relational terms such as first and second are only used to distinguish one entity or operation from another entity or operation, without necessarily requiring or implying any such actual relationship or order between these entities or operations. Moreover, the terms "comprising", "including", or any other variation thereof are intended to encompass non-exclusive inclusion, such that a process, method, product, or equipment that includes a series of elements not only includes those elements, but also includes other elements that are not explicitly listed, or also includes elements inherent to such process, method, product, or equipment. Without further limitations, the elements limited by the statement "including one . . . " do not exclude the existence of other identical elements in the process, method, commodity, or device that includes the said elements.

The above provides a detailed introduction to a display baseplate, a display panel, and a display apparatus provided in the present disclosure. Specific examples are applied in this specification to explain the principles and implementation methods of the present disclosure. The above examples are only used to help understand the methods and core ideas disclosed in the present disclosure.

The various embodiments in this specification are described in a progressive manner, and each embodiment focuses on the differences from other embodiments. The same and similar parts between each embodiment can be referred to each other.

The term "one embodiment", "embodiments" or "one or more embodiments" referred to in this specification means that specific features, structures, or features described in conjunction with the embodiments are included in at least one embodiment disclosed herein. Furthermore, please note that the example of the term "in one embodiment" may not necessarily refer to the same embodiment.

In the specification provided here, a large number of specific details are explained. However, it can be understood that the embodiments of the present disclosure can be practiced without these specific details. In some examples, well-known methods, structures, and techniques are not shown in detail to avoid blurring the understanding of this specification.

The present disclosure aims to cover any variations, uses, or adaptive changes of the present disclosure, which follow the general principles of the present disclosure and include common knowledge or customary technical means in the field of technology that are not disclosed in the present disclosure. The specification and embodiments are only considered exemplary, and the true scope and spirit of the present disclosure are indicated by the accompanying claims.

The invention claimed is:

1. A display baseplate, comprising a display region and a peripheral region located on at least one side of the display region, wherein the display baseplate comprises: a substrate, and a gate line driving circuit, a plurality of signal lines, and a gate line provided on one side of the substrate, wherein the gate line driving circuit and the plurality of signal lines are all located in the peripheral region, and the gate line is located in the display region, wherein, the gate line driving circuit is respectively connected to the plurality of signal lines and the gate line, and comprises a plurality of stages of driving units that are cascaded to each other, each driving unit comprises a first element group, and the first element group comprises at least one first electronic element; and the plurality of signal lines are arranged in a first direction, the first direction is an extending direction of the gate line, and at least one among the plurality of signal lines is located on one side of the first element group close to the display region, wherein the driving unit further comprises: a second element group located on one side of the first element group close to the display region and comprising at least one second electronic element; wherein the plurality of signal lines are divided into a first line group and a second line group, the first line group is located between the first element group and the second element group, and the second element group is located on one side of the second element group close to the display region, wherein the plurality of signal lines comprise: a first signal line located in the first line group and a second signal line located in the second line group; wherein, a current on the first signal line is less than or equal to a current on the second signal line, and wherein the first signal line is connected to a direct current signal input end, and the direct current signal input end is configured to input a direct current signal to the first signal line; and the second signal line is connected to an alternating current signal input end, and the alternating current signal input end is configured to input an alternating current signal to the second signal line.

2. The display baseplate according to claim 1, wherein at least one among the plurality of signal lines is located on one side of the driving unit close to the display region.

3. The display baseplate according to claim 1, wherein an area of an orthographic projection of the first electronic element on the substrate is greater than or equal to an area of an orthographic projection of the second electronic element on the substrate.

4. The display baseplate according to claim 1, wherein the driving unit comprises: a signal input end, a signal output end and a first transistor, wherein a control electrode of the first transistor is connected to the signal input end, a first electrode of the first transistor is connected to the control electrode of the first transistor or a high-level signal line, and the signal output end is connected to the gate line; wherein a signal input end of an i-th stage driving unit is connected to a first start signal line or a signal output end of an (i-j)-th stage driving unit, both i and j are positive integers, and j is less than i.

5. The display baseplate according to claim 4, wherein the first transistor is located in the second element group and disposed away from the display region, and the high-level signal line is located in the first line group and disposed close to the display region.

6. The display baseplate according to claim 4, wherein the first start signal line is located in the second line group and disposed close to the display region.

7. The display baseplate according to claim 5, wherein the plurality of signal lines further comprise:

a low-level signal line located in the first line group and disposed on one side of the high-level signal line away from the display region.

8. The display baseplate according to claim 1, wherein the driving unit comprises: a signal output end, a second transistor and a capacitor, wherein a control electrode of the second transistor is connected to a first electrode of the capacitor, a first electrode of the second transistor is connected to a clock signal line, a second electrode of the second transistor is connected to a second electrode of the capacitor and the signal output end, and the signal output end is connected to the gate line; where, the second transistor and the capacitor are both located in the first element group, and the clock signal line is located in the second line group.

9. The display baseplate according to claim 1, wherein the driving unit comprises: a third transistor and a fourth transistor, wherein a control electrode of the third transistor and a control electrode of the fourth transistor are both connected to a second start signal line, wherein, the third transistor and the fourth transistor are located in the second element group and disposed close to the display region, and the second start signal line is located in the second line group and disposed away from the display region.

10. The display baseplate according to claim 1, wherein the plurality of signal lines comprise a power supply voltage signal line and a clock signal line, and the driving unit comprises a plurality of transistors; wherein, a number of transistors connected to the power supply voltage signal line is greater than a number of transistors connected to the clock signal line, the power supply voltage signal line and the clock signal lime are both located in the second line group, and the power supply voltage signal line is located on one side of the clock signal line away from the display region.

11. The display baseplate according to claim 1, wherein the first line group comprises at least one of: a high-level signal line and a low-level signal line; and the second line group comprises at least one of: the low-level signal line, a power supply voltage signal line, a clock signal line and a start signal line.

12. The display baseplate according to claim 1, wherein the first element group and the second element group both comprise at least one of: a transistor and a capacitor.

13. The display baseplate according to claim 1, wherein the driving unit comprises a transistor; a control electrode of the transistor, the signal line, and the gate line are all located in a same film layer and made of a same material.

14. The display baseplate according to claim 1, wherein the display baseplate comprises two gate line driving circuits, the two gate line driving circuits are respectively a first gate line driving circuit and a second gate line driving circuit, the first gate line driving circuit is connected to a gate line located in an even row, and the second gate line driving circuit is connected to a gate line located in an odd row;

wherein, the first gate line driving circuit and the plurality of signal lines connected to the first gate line driving circuit are located on a first side of the display region, the second gate line driving circuit and the plurality of signal lines connected to the second gate line driving circuit are located on a second side of the display region, and the first side and the second side are two opposite sides along the first direction.

15. A display panel comprising a display baseplate including a display region and a peripheral region located on at least one side of the display region, wherein the display baseplate comprises: a substrate, and a gate line driving circuit, a plurality of signal lines, and a gate line provided on one side of the substrate, wherein the gate line driving circuit and the plurality of signal lines are all located in the peripheral region, and the gate line is located in the display region, wherein, the gate line driving circuit is respectively connected to the plurality of signal lines and the gate line, and comprises a plurality of stages of driving units that are cascaded to each other, each driving unit comprises a first element group, and the first element group comprises at least one first electronic element; and the plurality of signal lines are arranged in a first direction, the first direction is an extending direction of the gate line, and at least one among the plurality of signal lines is located on one side of the first element group close to the display region, wherein the driving unit further comprises: a second element group located on one side of the first element group close to the display region and comprising at least one second electronic element; wherein the plurality of signal lines are divided into a first line group and a second line group, the first line group is located between the first element group and the second element group, and the second element group is located on one side of the second element group close to the display region, wherein the plurality of signal lines comprise: a first signal line located in the first line group and a second signal line located in the second line group; wherein, a current on the first signal line is less than or equal to a current on the second signal line, and wherein the first signal line is connected to a direct current signal input end, and the direct current signal input end is configured to input a direct current signal to the first signal line; and the second signal line is connected to an alternating current signal input end, and the alternating current signal input end is configured to input an alternating current signal to the second signal line.

16. The display panel according to claim 15, wherein the display panel further comprises:

a cell substrate opposite to the display baseplate; and a sealant disposed between the cell substrate and the display baseplate, wherein an orthographic projection of the sealant on the substrate is located in the peripheral region;

wherein, the driving unit further comprises: a second element group located on one side of the first element group close to the display region and comprising at least one second electronic element; and the plurality of signal lines are divided into a first line group and a second line group, the first line group is located between the first element group and the second element group, and the second line group is located on one side of the second element group close to the display region; and the orthographic projection of the sealant on the substrate covers orthographic projections of the first element group, the first line group and at least part of the second element group on the substrate.

17. A display apparatus comprising:

a display panel including a display baseplate having a display region and a peripheral region located on at least one side of the display region, wherein the display baseplate comprises: a substrate, and a gate line driving circuit, a plurality of signal lines, and a gate line provided on one side of the substrate, wherein the gate line driving circuit and the plurality of signal lines are all located in the peripheral region, and the gate line is located in the display region, wherein, the gate line driving circuit is respectively connected to the plurality of signal lines and the gate line, and comprises a plurality of stages of driving units that are cascaded to each other, each driving unit comprises a first element group, and the first element group comprises at least one first electronic element; and the plurality of signal lines are arranged in a first direction, the first direction is an extending direction of the gate line, and at least one among the plurality of signal lines is located on one side of the first element group close to the display region, wherein the driving unit further comprises: a second element group located on one side of the first element group close to the display region and comprising at least one second electronic element; wherein the plurality of signal lines are divided into a first line group and a second line group, the first line group is located between the first element group and the second element group, and the second element group is located on one side of the second element group close to the display region, wherein the plurality of signal lines comprise: a first signal line located in the first line group and a second signal line located in the second line group; wherein, a current on the first signal line is less than or equal to a current on the second signal line, and wherein the first signal line is connected to a direct current signal input end, and the direct current signal input end is configured to input a direct current signal to the first signal line; and the second signal line is connected to an alternating current signal input end, and the alternating current signal input end is configured to input an alternating current signal to the second signal line;

a driving chip connected to the plurality of signal lines and configured to provide a driving signal to the plurality of signal lines.

* * * * *